United States Patent Office 3,530,103
Patented Sept. 22, 1970

3,530,103
COPOLYMERS OF CARBON BISULFIDE AND CERTAIN MONOOLEFINIC MONOMERS
Harold M. Pitt, Lafayette, Calif., assignor to Stauffer Chemical Company, New York, N.Y., a corporation of Delaware
No Drawing. Continuation of application Ser. No. 461,169, June 3, 1965. This application June 12, 1969, Ser. No. 836,207
Int. Cl. C08g 23/00
U.S. Cl. 260—79                                                    12 Claims

ABSTRACT OF THE DISCLOSURE

A copolymer of carbon bisulfide and any organic material containing an unsaturated alkyl chain and which is capable of undergoing free radical polymerization or copolymerization by contacting said carbon bisulfide and said organic material in an inert atmosphere under the illumination of light having a wave length of 3000 to 6000 angstroms or in the presence of a catalyst at a temperature about approximately 35° C. and the copolymers produced thereby.

---

This is a continuation of application Ser. No. 461,169 filed June 3, 1965 now abandoned.

The present invention involves the copolymerization of carbon bisulfide with any organic material which may be polymerized or copolymerized by a free radical mechanism and the copolymers, terpolymers, and the like made thereby.

More particularly, it has been found that while carbon bisulfide can be homopolymerized only at exceedingly high pressures it may be copolymerized with any organic material containing an unsaturated alkyl chain and which is capable of undergoing free radical polymerization or copolymerization, said organic material being selected from the group consisting of hydrocarbons, halogenated hydrocarbons, ethers, acetals, inner oxides, aldehydes, ketones, acids, esters, acid anhydrides, tertiary amides, nitriles, tertiary imides, silanes, and mixtures thereof.

Typical monomers which are copolymerizable with carbon bisulfide are ethylene, styrene, butadiene, vinyl chloride, vinylidene chloride, vinyl fluoride, tetrafluoroethylene, vinyl methyl ether, acrolein acetal, butadiene monoxide, acrolein, vinyl methyl ketone, acrylic acid, methacrylic acid, acrylates, methacrylates, vinyl acetate, acrylic acid anhydride, dimethyl acrylamide, acrylonitrile, ethylene dicyanide, n-vinyl pyrrolidone, vinyl silane, and the like. This listing merely shows typical compounds in the general class which are copolymerizable with carbon bisulfide and is not intended to be comprehensive.

The copolymers of the present invention can be made by various methods. One such method is by copolymerizing carbon bisulfide in the presence of the selected polymerizable monomer or monomers under irradiation of light having a wave length of approximately 3000 to 6000 angstroms. The resulting polymers contain up to 20% by weight of sulfur and are useful as adhesives and molding compositions. Films and sheets have been formed from these copolymers and they have been extruded and used in injection molding successfully.

In greater detail, the method for preparing the copolymers of the present invention by irradiation with light consists of charging carbon bisulfide and the selected polymerizable monomer or monomers into a Pyrex vessel. Said Pyrex vessel is double walled or jacketed to enable temperature control and is equipped with a stirrer. Care should be taken to prevent the reactants from contacting the atmosphere during polymerization and this may be accomplished by having an inert atmosphere such as argon above the reactants in the reaction vessel. The reactor is surrounded by lamps which emit light energy of the proper wave length.

The above described Pyrex vessel may be constructed of any other material that will contain the reaction and allow light of the proper wave length to pass. Obviously, a reactor made of opaque materials such as metals and the like may be used as well if the lamps providing light of the proper wave length are submerged in the reaction zone or at least irradiate the reactants. The temperature of the reaction may be in the range of from about —20° C. to +40° C. and is readily maintained by use of the cooling jacket. In some instances, higher or lower temperatures may be used, at least during a part of the polymerization.

A free radical initiator is necessary to enable the reaction to proceed when the energy emitted by the lamps is insufficient. When copolymerizing $CS_2$ with some monomers, for example, vinylidene chloride, the irradiation by light of the proper wave length alone was sufficient initiation to enable the polymerization to proceed. In other polymerizations, an additional initiator is needed and this is dictated by the monomer sought to be copolymerized with $CS_2$. Such free radical initiators are familiar to those skilled in the art. Typical free radical initiators are bisazo-isobutyronitrile, benzoyl peroxide with benzoin methyl ether, and bromotrichloromethane.

The following examples of the photochemical method of copolymerization are given for purposes of illustration.

EXAMPLE 1

Numerous copolymerizations of $CS_2$ and vinyl chloride have been made photochemically. Both General Electric black fluorescent lamps and General Electric blue fluorescent lamps have been used for irradiation.

(A) Carbon bisulfide (2000 ml.) and bisazo-isobutyronitrile (2 grams) were transferred to a three liter double-walled Pyrex reaction vessel. The reaction vessel was fitted with a paddle-stirrer having ground glass bearings, an inlet for argon with a mercury seal and temperature control means. A Dry Ice condenser was attached to the reaction vessel and vinyl chloride was condensed into the reaction mixture with slow stirring. Slightly more than 1000 ml. vinyl chloride was added in this manner and the excess of vinyl chloride over 1000 ml. was then boiled off to purge the reaction system of any oxygen present. The reaction mixture was next cooled to —5° C. by circulating cool methanol through the jacket of the reaction vessel and such temperature was maintained throughout the copolymerization as was a slow argon purge.

After reaching reaction temperature (—5° C.), the reaction vessel was then encircled by a set of 15 General Electric 15 watt blue lamps (G.E. F15T8–B). The lamps were positioned so that they were approximately one inch from the perimeter of the reaction vessel and were then activated through a constant voltage transformer to insure that a constant voltage to the lamps was maintained at all times.

The copolymerization was allowed to proceed for 22 hours at —5° C. At the end of this 22 hour reaction period, the reaction mixture was warmed to remove some of the unreacted vinyl chloride. When the volume of the reaction mixture had been reduced to about 1500 ml., methanol (1000 ml.) was added. The precipitated copolymer was filtered and slurried again with about 1 liter of methanol. This was followed by two ether washings using one liter of ether for each wash. The copolymer was then air dried. In a typical run from one liter of vinyl chloride, the yield of copolymer was 140 grams (12.9% conversion). The sulfur analysis showed 0.05%"

sulfur present and the intrinsic viscosity of the copolymer was 0.99.

The copolymer obtained from thirteen such individual runs were combined and dry-blended for several hours with a ball mill. This blend produced a material having a sulfur analysis of 0.05% sulfur and an intrinsic viscosity of 0.99.

One hundred parts of the blended polymer were then compounded with 1 part lubricant, 0.25 part stearic acid, and 3.5 parts of tin stabilizers. This material was then milled, pressed and finally shaped into bars from a flat sheet. The dimensions of the bars so formed were in accordance with the ASTM test requirements which were to be performed.

A tensile strength test according to ASTM D638–61T and ASTM D882–61T was performed and the results were as follows:

Tensile strength—8730 p.s.i.
Percent elongation at yield—9.9
Elastic modulus—1.58 p.s.i. $\times 10^5$ The yield strength was determined according to ASTM D790–63 and was 17,800 p.s.i. The Izod Impact test according to ASTM D256–56 was 0.71. The Shore D Hardness was 85 (ASTM D1706–61) and the deflection temperature under load (ASTM 648–56) was 73.0° C. In addition, the vinyl chloride-$CS_2$ copolymer exhibited outstanding stability on numerous plastograph tests.

(B) One liter of vinyl chloride and 2 liters of $CS_2$ were charged to a Pyrex reaction as described in A above under an atmosphere of argon. One gram of the initiator, bisazo-isobutyronitrile, was added to the reactor and the reactor was surrounded by 20 15-watt blue fluorescent lamps. The temperature of the reactants was maintained at approximately −5° C. by circulation of a cooling fluid through the cooling jacket on the reactor. After 21 hours in which the material in the reactor was constantly stirred, 91 grams of copolymer having an intrinsic viscosity of 0.87 was produced. After stripping all excess $CS_2$ from the copolymer, the sulfur content of the copolymer was 0.25%. The product was a white solid whose infrared spectrum differed from pure PVC. After milling a brittle material resulted, but heat treatment for 15 minutes destroyed brittleness and yielded a good, light yellow plastic polymer which had a tensile strength of 8460 p.s.i. at 70° F.

(C) One liter of vinyl chloride and 2 liters of $CS_2$ were reacted as stated in A above at a temperature of about −7° C. and being irradiated by four 15-watt blue fluorescent lamps. After 26 hours, 117 grams of copolymer having an intrinsic viscosity of 1.44 in tetrahydrofuran at 30° C. and containing 0.33% sulfur were produced. This copolymer was milled for 2½ minutes at about 360° C. and resulted in a material having a tensile strength of 8400 lbs./sq. in.

To show that these were true copolymers and not mere mixtures, samples of the products B and C above were treated in two ways. One method was to continuously extract for 24 hours in a Soxhlet with $CS_2$ followed by an ether extraction. The other method was to dissolve a portion of the sample in tetrahydrofuran and partially precipitate with methanol. On recovery and drying, the materials consistently maintained their original sulfur content.

Numerous other runs were conducted under various conditions and results ranged from sticky, heavy syrups to hard, brittle solids depending on molecular weight and sulfur content.

EXAMPLE 2

Vinyl acetate-$CS_2$ mixtures in the following ratios were copolymerized at room temperature overnight while illuminated by black fluorescent lamps (15 watt General Electric F15T8–BL) and initiated by bisazo-isobutyronitrile as in Example 1. The following table gives the sulfur contents and some physical characteristics of the resultant copolymers.

| | | | |
|---|---|---|---|
| ViAc (vols.) | 35 | 30 | 20 |
| $CS_2$ (vols.) | 5 | 10 | 20 |
| S content (percent by wgt.) | 0.2 | 0.70 | 1.55 |
| Character | (1) | (1) | (2) |

[1] Yellow solid.
[2] Sticky syrup.

EXAMPLE 3

Styrene-$CS_2$ mixtures in the following ratios were illuminated as in Example 1 at room temperature with black fluorescent lamps, initiated with bisazo-isobutyronitrile and run overnight. The following table gives the sulfur content of the resultant copolymers.

| | | | | |
|---|---|---|---|---|
| Styrene (vols.) | 1 | 2 | 3 | 4 |
| $CS_2$ (vols.) | 4 | 3 | 2 | 1 |
| S content (percent by wgt.) | 4.51 | 2.77 | 1.3 | 0.7 |

NOTE.—Yellow solids were obtained in all cases.

EXAMPLE 4

One volume of methyl methacrylate and four volumes of $CS_2$ were polymerized slowly using bisazo-isobutyronitrile as the initiator while exposed to blue fluorescent light. Temperature was ambient. The resultant slightly yellow copolymer contained 0.53% by weight of sulfur and possessed good film forming properties.

EXAMPLE 5

Approximately three volumes of $CS_2$ and four volumes of butadiene were illuminated by blue fluorescent lamps. One percent by weight of bisazo-isobutyronitrile was used as an initiator. A solid copolymer containings 16.5% by weight of sulfur resulted. A low molecular weight brown oil also was obtained which on standing changed to a rubbery solid and finally to a brittle solid containing 18% by weight of sulfur.

EXAMPLE 6

One volume vinylidene chloride and four volumes $CS_2$ polymerized slowly in blue fluorescent light only, at ambient temperature. The resulting copolymer contained 2.39% by weight of sulfur and was a dark solid.

EXAMPLE 7

Approximately 1 volume acrylonitrile and 6 volumes $CS_2$ were copolymerized at ambient temperature using bisazoisobutyronitrile as the initiator and exposing the reactants to blue fluorescent light. The product contained 0.25% by weight of sulfur and was a white solid.

Ethyl acrylate, methyl acetylene, and vinyl methyl ether were also copolymerized with $CS_2$, yielding copolymers in each case.

Numerous vinyl chloride-vinylidene chloride-$CS_2$ terpolymers have been prepared for mixtures of these monomers in various proportions. Elastomers with good memories, rigid foams and materials of high solubility have been obtained. These properties depend in part on initial monomer proportion or concentration when reacted photochemically under blue or black fluorescent light as described in previous examples. Other such terpolymers have been made with $CS_2$ using monomers capable of polymerizing or copolymerizing under free radical conditions and the resultant polymeric materials have proven to be useful as elastomers, rigid foams, films, sheets and the like. Examples of such terpolymers are $CS_2$-vinyl chloride-vinyl acetate; $CS_2$-vinyl chloride-acetylene; $CS_2$-vinyl chloride-methyl acrylate; $CS_2$-vinyl chloride-ethyl acrylate; $CS_2$-vinyl chloride-methyl methacrylate, and $CS_2$-vinyl chloride-n-butyl acrylate.

A second method of preparing the $CS_2$ copolymers of the present invention as previously stated is to react $CS_2$ and the selected monomer or monomers in a closed reaction vessel in the presence of a polymerization catalyst in the dark. Some illustrative examples of these thermal reactions which are preferably conducted above about 35° C. are as follows:

EXAMPLE 8

200 cc. $CS_2$ and 75 cc. of vinyl chloride were charged to a pressure vessel which comprised an ordinary glass carbonated beverage bottle along with 0.2 gram of bisazo-isobutyronitrile initiator and 0.01 gram of ethyl acetylene promotor. The pressure vessel was then flushed with argon and capped. The pressure vessel was constantly agitated in the dark at a temperature of 55° C. and after 22½ hours a yellowish solid polymer (47 grams) resulted having a sulfur content of 0.9% by weight.

EXAMPLE 9

135 cc. $CS_2$ and 135 cc. vinyl acetate were charged to a pressure vessel along with 0.1 gram of bisazo-isobutyronitrile initiator and 0.01 gram of ethyl acetylene promotor. The pressure vessel was constantly agitated in the dark at a temperature of 55° C. and after 22½ hours a yellowish solid polymer resulted which contained 1.13% by weight of sulfur.

EXAMPLE 10

125 cc. $CS_2$, 125 cc. vinyl chloride and 25 cc. vinyl acetate were charged to a pressure vessel along with 0.2 gram bisazo-isobutyronitrile initiator. The temperature was maintained at 55° C. for 23 hours and the vessel was constantly agitated. 84 grams of a solid terpolymer resulted which analyzed 2.40% by weight of sulfur.

This thermal method for the preparation of the copolymers of the present invention likewise requires free radical initiation and the degree of initiation required depends on the particular monomers to be copolymerized with the $CS_2$. Moderate heat alone will initiate some of the reactions, while to others the addition of a free radical initiator is desirable. Such free radical initiation is well-known to those skilled in the art. Examples of such free radical initiators which may be employed in producing the copolymers of the present invention by the described thermal method are organic peroxides, such as benzoyl peroxide, t-butyl peroxide, dicaproyl peroxide, dicaprylyl peroxide, lauroyl peroxide; the hydroperoxides such as cumene hydroperoxide; isopropylpercarbonate, and the like. Diazoamino compounds and diazothioethers also are useful free radical initiators. Iodine is a known initiator for polymerizing vinyl methyl ether and can be used in the present photochemical or thermal processes for copolymerizing vinyl methyl ether with carbon bisulfide.

The following example illustrates another method of free radical copolymerization in which a trialkyl borane-cumenehydroperoxide catalyst system is utilized.

EXAMPLE 11

A three liter double jacketed cylindrical reactor was equipped with a stirrer, thermometer and argon purge system. The external jacket of the reactor formed an external vacuum space to minimize heat exchange with the outside atmosphere by the cooling jacket which it surrounded. The cooling jacket was thermally regulated.

Into the interior of the reactor was fed 750 ml. of carbon bisulfide and then 2400 ml. of vinyl chloride was condensed into the reactor using a Dry-Ice condenser. While stirring, the excess vinyl chloride (150 ml.) was slowly evaporated until the volume of reactants reached the three liter level. The reactor was then further purged with argon (300 ml./min.) and quickly cooled to −10° C. Then fourteen (14) grams of triethylborane was involved in 100 ml. of $CS_2$ and added to the reaction mixture with the exclusion of air. The argon purge flow rate was then reduced to 20 mls./min. Then by the aid of a metering pump, a solution of 8 ml. of cumene hydroperoxide in 100 ml. of trichlorotrifluoroethane was added over a period of five hours. During this time the temperature was constantly maintained at −10° C. After the addition of all the cumene hydroperoxide, the reaction mixture was stirred for an additional hour while maintaining the same constant temperature. Thereafter, the cooling was stopped and the temperature raised slowly to 30° C. by circulating warmer and warmer fluid in the jacket. Methanol (500 ml. in total) was added to the reaction mixture gradually as the unreacted vinyl chloride evaporated therefrom. The resulting mixture was filtered and further worked up as described in Example 1–A. In a typical run 450 grams of copolymer were obtained which had a sulfur content of 0.26% by weight and had an I.V. of 0.54.

EXAMPLE 12

This example illustrates another catalyst system which may be employed in the copolymerization of vinyl chloride and carbon bisulfide. The reactor used was the same as described in the previous example.

Carbon bisulfide (1000 ml.) and methanol (750 ml.) were added to a three liter reactor, and cooled to −15° C. while 1250 ml. of vinyl chloride was added. While under a blanket of argon, sodium caproate (6.2 grams) and $FeSO_4 \cdot 7H_2O$ (6.2 grams) were added.

While the above mixture was stirred and maintained at −15° C., a 48 ml. lauroyl peroxide-benzene solution containing 9.25 grams of lauroyl peroxide was metered into the reactor over a period of 48 hours. The copolymer formed slowly over this period and separated as an insoluble suspension. The reaction mixture was diluted with 2 liters of methanol and then unreacted vinyl chloride and carbon bisulfide were removed under vacuum at 30° C. The residual suspensions were filtered, washed consecutively with three liters of methanol containing 200 ml. concentrated HCl and 2 liters of dry methanol. The white powder product was then dried at 35° C. The yield of copolymer was 180 grams and had a sulfur content of 0.20% by weight. The intrinsic viscosity was 1.04.

Another method of preparing the copolymers of the present invention is by means of ionic polymerization. The standard ionic polymerization catalysts may be employed. Friedel-Crafts-type catalysts such as titanium tetrachloride and stannic chloride are therefore useful in these polymerization processes. The temperature and reaction time employed in such ionic polymerizations merely determine the rate of reaction and molecular weight of the resultant polymers. Such ionic polymerizations should be conducted without water being present except where traces of water serve to supply protons. Illustrative examples of such ionic polymerizations are as follows:

EXAMPLE 13

In a 175 mm. test tube, butadiene-1,3 was bubbled into 40 ml. $CS_2$ containing a catalytic amount of $TiCl_4$ at 0° C. A white precipitate formed which after extensive washing with methanol analyzed 0.73% S. The infrared spectrum of this polymer was taken in a KBr pellet and it was similar to that of polybutadiene.

I claim:

1. A copolymer consisting essentially of carbon bisulfide and at least one monoolefinic monomer copolymerizable therewith, said monomer being capable of undergoing free radical polymerization or copolymerization and selected from the group consisting of ethylene, styrene, vinyl chloride, vinylidene chloride, vinyl fluoride, tetrafluoroethylene, vinyl methyl ether, acrolein acetal, butadiene monoxide, acrolein, vinyl methyl ketone, acrylic acid anhydride, dimethyl acrylamide, acrylonitrile, ethylene dicyanide, n-vinyl pyrrolidone, and vinyl silane.

2. A copolymer of carbon bisulfide and vinyl chloride.

3. A copolymer of carbon bisulfide and vinyl acetate.

4. A copolymer consisting essentially of carbon bisulfide and styrene.

5. A copolymer of carbon bisulfide and methyl methacrylate.

6. A copolymer of carbon bisulfide and acrylonitrile.

7. A terpolymer of carbon bisulfide, vinyl chloride and vinyl acetate.

8. A terpolymer of carbon bisulfide, vinyl chloride and acetylene.

9. A terpolymer of carbon bisulfide, vinyl chloride and methyl acrylate.

10. A terpolymer of carbon bisulfide, vinyl chloride and methyl methacrylate.

11. A terpolymer of carbon bisulfide, vinyl chloride, and ethyl acrylate.

12. A terpolymer of carbon bisulfide, vinyl chloride and n-butyl acrylate.

References Cited

UNITED STATES PATENTS

| | | | |
|---|---|---|---|
| 2,405,950 | 8/1946 | Hanford | 260—94 |
| 2,471,959 | 5/1949 | Hunt | 260—89.5 |
| 3,334,036 | 8/1967 | Wright | 204—162 |

DONALD E. CZAJA, Primary Examiner

M. I. MARQUIS, Assistant Examiner

U.S. Cl. X.R.

204—159.24, 162; 260—2.5, 18, 45.75, 63, 67, 79.5